United States Patent [19]

Bass et al.

[11] 3,888,189
[45] June 10, 1975

[54] METHOD OF LOADING AGRICULTURAL MACHINES ON A RAILROAD

[75] Inventors: Merlyn Duane Bass; Ralph August Gerhardt, both of Ottumwa, Iowa

[73] Assignee: Deere & Company, Moline, Ill.

[22] Filed: May 16, 1974

[21] Appl. No.: 470,376

Related U.S. Application Data

[62] Division of Ser. No. 354,994, April 27, 1973.

[52] U.S. Cl............................. 105/367 R; 214/152
[51] Int. Cl............................................. B60p 7/08
[58] Field of Search........ 214/152, 10.5 R; 105/367, 105/368 R, 368 B; 206/19.5 R

[56] References Cited
UNITED STATES PATENTS

| | | | |
|---|---|---|---|
| 1,837,062 | 12/1931 | Oppenheim....................... | 105/367 |
| 3,102,646 | 9/1963 | Clejan............................... | 214/152 |
| 3,455,406 | 7/1969 | Soteropulos...................... | 180/27 |
| 3,691,963 | 9/1972 | Krokos............................. | 214/152 X |

*Primary Examiner*—M. Henson Wood, Jr.
*Assistant Examiner*—Gene A. Church

[57] ABSTRACT

A self-propelled windrower has a traction unit with a fore-and-aft body mounted on a pair of forward drive wheels and a pair of rearward caster wheels carried on an oscillating axle, the opposite drive and caster wheels being disposed outwardly of the opposite sides of the body. The oscillating axle is removable, and alternate mounting means are provided on the body for mounting the caster wheels directly to the body when the axle is removed. The windrower includes a removable transversely elongated header, and four windrowers and headers are mounted on a single flatcar in two sets. The axles and the headers are removed from the windrowers for shipping and the caster wheels are positioned in their alternate mounting on the body. The traction units are positioned on the railroad car in a fore-and-aft direction, with the rearward end of the windrowers in each set opposite one another with the two headers for the two traction units disposed longitudinally on opposite sides of the traction unit bodies, the headers being disposed in a fore-and-aft direction between the fore-and-aft aligned drive wheels of the opposite traction units.

2 Claims, 4 Drawing Figures

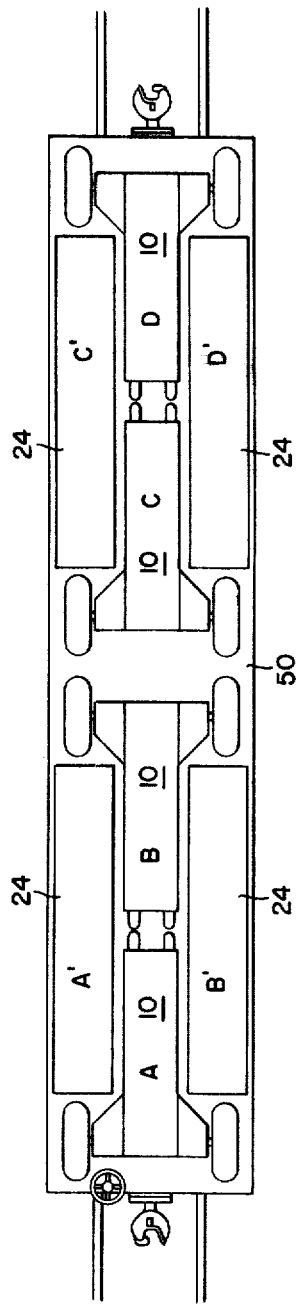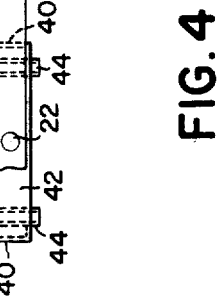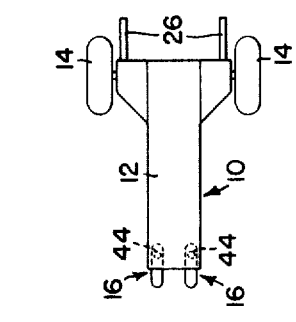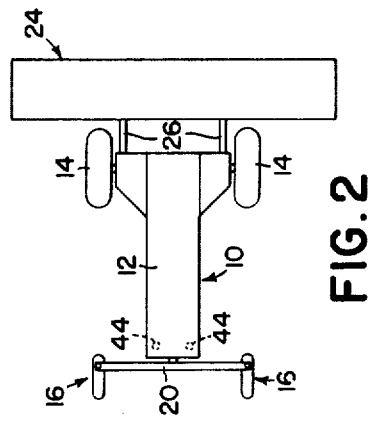

METHOD OF LOADING AGRICULTURAL MACHINES ON A RAILROAD

This is a division of application Ser. No. 354,994 filed Apr. 27, 1973.

BACKGROUND OF THE INVENTION

A windrower conventionally includes a traction unit having a pair of forward drive wheels and a rear caster wheel means. Many smaller windrowers utilize only a single rearward caster wheel, while many of the larger, newer units utilize a pair of caster wheels mounted on the opposite ends of an oscillating axle structure, the caster wheels tracking the forward drive wheels. Such windrowers also conventionally include a forward transversely elongated header or harvesting platform, that is vertically adjustable relative to the traction unit and removable therefrom.

The windrowers, of course, are frequently shipped by rail car, and since the headers are normally wider than a rail car, the headers are removed during shipment of the machines. While four of the larger four-wheel traction units will fit easily on a railway flatcar, there has been insufficient area for all four of the associated headers, and accordingly, it has not been possible to ship four windrowers on a single flatcar.

SUMMARY OF THE INVENTION

According to the present invention, means are provided for easily altering the windrowers to permit the shipping of four traction units and headers on a single flatcar. More specifically, means are provided on the windrower for repositioning the rear caster wheels on the traction unit during assembling, shipment, and storage, so that the traction unit requires less space than when the caster wheels are mounted in their normal position for use in the field. Still more specifically, alternate vertical sockets are provided at the rearward end of the traction unit body for receiving the vertical pivots of the caster wheels, which are normally mounted in vertical sockets at the opposite ends of a rear axle structure substantially outwardly from the opposite sides of the body, the rear axle being removable when the caster wheels are repositioned in their alternate shipping position to reduce the space required for the traction unit.

Also according to the invention, four windrower traction units are positioned on a railway flatcar with the fore-and-aft traction unit bodies in fore-and-aft alignment, the traction units being mounted in pairs with their rearward ends abutting one another. The rear axles are removed and the rear caster wheels are positioned below the rearward end of the traction unit bodies inwardly of the normal caster wheel position. The two headers for each pair of windrowers are then positioned longitudinally on opposite sides of the traction unit bodies between the fore-and-aft aligned drive wheels of the opposite traction units, the removal of the rear axles permitting the headers to be positioned close enough to the opposite sides of the traction unit bodies so that the headers will not extend over the edges of the flatcar.

BRIEF DESCRIPTION OF THE DRAWINGS

FIG. 1 is a schematic plan view of a railway flatcar with four windrowers mounted thereon according to the invention.

FIG. 2 is a schematic plan view of a windrower with the header mounted on the windrower and with the rear caster wheels in their normal position.

FIG. 3 is a schematic plan view of the windrower with the header removed and the caster wheels mounted in their alternate shipping position.

FIG. 4 is a rear elevation view of a portion of the rearward end of the windrower with the caster wheels in their normal position.

DESCRIPTION OF THE PREFERRED EMBODIMENT

The invention is embodied in a self-propelled windrower having a traction unit, indicated generally by the numeral 10. The traction unit includes a generally fore-and-aft body 12 carried by a pair of forward drive wheels 14 and a pair of rearward caster wheel structures 16 mounted in vertical pivots 18 at the opposite ends of a rear axle structure 20, which is mounted for oscillation relative to the body 12 on a fore-and-aft pivot 22.

A transversely elongated header 24 is carried by the traction unit 10 and is mounted for vertical adjustment thereon by a pair of forwardly extending lift arms 26. The above represents more or less well known windrower construction and, as is well known, the body 12 has a rearward engine and a forward operator's station. The above-described windrower is described in its normal condition, wherein it is usable in a field for harvesting a crop as the machine advances, the normal condition of the windrower being as illustrated in FIG. 2. As is also well known, the header 24 is easily removable from the lift arms 26 for transport of the machine or for replacing the header.

The rear axle 20 and caster wheel structures 16 are shown in greater detail in FIG. 4, the pivots 18 being formed by a vertical pivot shaft 28 that forms a part of the caster wheel structure 16 and extends upwardly through and is rotatable in an axially vertical sleeve or socket 30 on the outer end of the axle 20. The shaft 28 is retained in the sleeve 30 by means of a locking collar 32 mounted on the upper end of the shaft and engaging the top of the sleeve, the caster wheel structure being easily removable from the axle by simply removing the locking collar 32.

The caster wheel structure 16 also includes a forked member 34, connected to the lower end of the pivot shaft and inclined downwardly and rearwardly therefrom, and a wheel 36 rotatable on a transverse axle 38 extending between the opposite arms of the forked member 34, the above representing well known rear axle construction for a windrower.

The windrower body 12 includes a pair of channel-like side frame members 40 extending in a fore-and-aft direction along the lower opposite sides of the body 12, the rearward ends of the side frame members 40 being connected by a channel-like rear frame member 42. A pair of alternate sleeves or sockets 44, similar to the sleeves 30, are respectively attached to the opposite side frame members 40 adjacent their rearward end interiorly of the rear frame member 42. Since the alternate sleeves 44 are similar to the sleeves 30, they are adapted to receive the pivot shafts 28 of the caster wheel structures, so that the caster wheel structures 16 can respectively be attached directly to the body by simply removing the locking collars 32, pulling the shafts 28 from the sleeves 30, and inserting the shafts 28 into the alternate sleeves 44, locking the caster wheel structures in their alternate position by means of the locking collar 32. When the caster wheel structures are mounted in their alternate position, as shown in FIG. 3, the rear axle 20 can be removed from the rear axle pivot 22, as a known manner.

As shown in FIG. 1, when the caster wheels are mounted in their alternate positions, and the headers 24 and rear axles 20 are removed, four windrowers can be mounted on a single railway flatcar, which is indicated by the numeral 50, the traction units of the four windrowers being respectively labled A, B, C and D in FIG. 1, while their associated headers are labled A', B', C' and D'.

As is apparent from FIG. 1, the windrowers are mounted on the railway car in two identical sets with two windrowers in each set. In one set windrowers A and B are positioned on the railway car with their fore-and-aft traction unit bodies in fore-and-aft alignment on the railway car, the rearward ends of the bodies facing each other, so that the caster wheel structures, which are in their alternate positions, substantially abut each other. The bodies 12 are centered on the railway car, the width of the traction units at the drive wheels being slightly less than the width of the railway car, while the combined length of the traction units A and B is less than half the length of the railway car. The headers A' and B' are placed on the car on opposite sides of the aligned bodies of the traction units A and B, the elongated dimension of the headers, which is the width of the header in operation, extending in a fore-and-aft direction on the car. As is apparent, the length of the header is less than the distance between the drive wheels 14 of the opposite traction units, so that the headers are disposed between the opposite drive wheels. As is also apparent, the width of the bodies 12 plus the combined width of the headers A' and B' on the railway car is slightly less than the width of the railway car, the width of the headers being the fore-and-aft dimension of the header when it is in its operating position. Obviously, if the caster wheel structures were in the normal position, as shown in FIG. 2, the headers A' and B' would not fit on the railway car.

In addition to permitting the shipping of four windrowers on a single flatcar as described above, the alternate positions of the caster wheel structures can also be used during the assembly or storage of the windrowers to conserve space.

We claim:

1. A method of shipping a plurality of agricultural machines on a railway car, having a width slightly greater than the width of the machines at the drive wheels, each machine having a transversely elongated removable header and a traction unit, with a fore-and-aft body mounted on a pair of forward drive wheels spaced outwardly from opposite sides of the body and a pair of rear caster wheels normally mounted on a rear axle structure on opposite sides and outwardly of the body, comprising: providing alternate mounting means for the caster wheels on the machine body adjacent the opposite sides; removing the headers from the plurality of machines; removing the caster wheels from their normal position on the axle and placing them in their alternate positions on the body on said machines; removing the axle structures; positioning at least one pair of the machines on the railway car, each pair being formed by positioning the traction units of two machines on a railway flatcar with their bodies in fore-and-aft alignment approximately at the fore-and-aft center line of the railway car and with the rearward ends of the traction units facing one another, and placing the headers for the two machines with the longitudinal dimension of the headers in a fore-and-aft direction on opposite sides of the traction unit bodies between the drive wheels of the opposite traction units.

2. The invention defined in claim 1 wherein two pairs of machines are mounted on the same railway car.

* * * * *